(12) United States Patent
Furbeck

(10) Patent No.: US 8,381,084 B2
(45) Date of Patent: Feb. 19, 2013

(54) APPARATUS, AND ASSOCIATED METHOD, FOR DECODING CONVOLUTIONALLY ENCODED DATA

(75) Inventor: David Furbeck, Keller, TX (US)

(73) Assignee: Research In Motion Limited, Waterloo (CA)

( * ) Notice: Subject to any disclaimer, the term of this patent is extended or adjusted under 35 U.S.C. 154(b) by 977 days.

(21) Appl. No.: 12/256,358

(22) Filed: Oct. 22, 2008

(65) Prior Publication Data

US 2009/0193320 A1 Jul. 30, 2009

Related U.S. Application Data

(60) Provisional application No. 60/982,045, filed on Oct. 23, 2007.

(51) Int. Cl.
*H03M 13/03* (2006.01)
(52) U.S. Cl. .......................... 714/794; 714/786; 340/436
(58) Field of Classification Search .................. 714/786, 714/794, 795; 340/425.5, 436
See application file for complete search history.

(56) References Cited

U.S. PATENT DOCUMENTS

| | | | | |
|---|---|---|---|---|
| 6,061,823 A | * | 5/2000 | Nara | 714/758 |
| 7,924,934 B2 | * | 4/2011 | Birmingham | 375/265 |
| 2005/0289429 A1 | * | 12/2005 | Bottomley et al. | 714/746 |
| 2007/0142028 A1 | * | 6/2007 | Ayoub et al. | 455/404.1 |
| 2007/0264964 A1 | * | 11/2007 | Birmingham | 455/403 |

FOREIGN PATENT DOCUMENTS

EP 1170870 A1 1/2002

OTHER PUBLICATIONS

Vehicle Functionality Working Group: "European e-Call Functional Specifications in Vehicle System"; Esafety Support Office, 2006, XP002553419.

* cited by examiner

*Primary Examiner* — Joshua Lohn

(57) ABSTRACT

An apparatus, and an associated method, for correcting errors in decoded data, decoded by a convolutional decoder, such as an SOVA (Soft Output Viterbi Algorithm). A CRC check is performed upon the decoded data. If the CRC check fails, a conclusion is made that the decoded data contains errors. Portions of the decoded data indicated to exhibit low levels of reliability are toggled with values of most-likely error events. A corrected sequence of the decoded data is formed that corrects for the errors in the decoded data.

18 Claims, 7 Drawing Sheets

APPARATUS, AND ASSOCIATED METHOD, FOR DECODING CONVOLUTIONALLY ENCODED DATA

CROSS-REFERENCE TO RELATED APPLICATIONS

The present application claims the priority of U.S. Provisional Patent Application, Ser. No. 60/982,045, filed on 23 Oct. 2007, the contents of which are incorporated herein by reference.

The present disclosure relates generally the communication of convolutionally encoded data. More particularly, the present disclosure relates to apparatus, and an associated method, for correcting errors in data, associated with the data, once received and decoded at a receiving station.

By correcting the errors rather than requesting resending of the data, delays associated with a resend request, and then resending the data, are avoided.

BACKGROUND OF THE DISCLOSURE

Advancements in communication technologies have permitted the development and deployment of many new types of communication devices and the introduction of many new types of communication services. For instance, the networks of cellular communication systems have been deployed over significant portions of the populated areas of the world. A subscriber to a cellular communication system communicates with the network part of the system through use of a cellular mobile station positioned within a coverage area defined by the network. A radio air interface is defined between the mobile station and the network and radio signals are communicated therebetween by way of the radio air interface.

The network of the cellular communication system is connected to other communication networks, such as a packet data network and a conventional, telephonic network. Communications are thereby effectuable between the mobile station and an endpoint of the data network or telephonic network. Because the mobile station communicates by way of radio signals communicated on the radio air interface, the mobile station need not be positioned at a location at which wireline connections are available to interconnect the mobile station with a communication network. Communication mobility is also permitted of the mobile station as the mobile station is operable free of any fixed connection to a communication network.

Many millions of subscribers make use of cellular communication systems through which to communicate telephonically and to communicate data. Many cellular mobile stations also provide for communications by hearing-impaired users. Such mobile stations include TTY (Text Telephony) elements, typically including TTY modems, that provide for textual entry of data by a user at the mobile station as well as reception of TTY data displayable in visual form for the user of the mobile station.

Use of a cellular communication system through which to communicate provides many conveniences, e.g., permitting subscribers to communicate even when positioned at locations at which wireline connections are unavailable. A subscriber is able to communicate, for instance, when traveling in a motor vehicle. Moreover, cellular communication systems not only provide for convenience, but also are advantageously utilized for purposes of personal and public safety. A subscriber is able to communicate, using a cellular communication system, with emergency personnel, such as those of an emergency dispatch center to request emergency assistance and to report emergency conditions. Emergency dispatch centers, herein referred to, at times, as Public Safety Access Points (PSAPs), have equipment and personnel for communicating with those requesting assistance. Such PSAPs also typically include TTY devices to communicate with requesters that utilize TTY devices.

Recent attention has been directed towards manners by which automatically to report vehicular emergencies, e.g., accidents in which airbags are deployed or in which a vehicle is overturned. Automatic reporting ensures that emergency personnel shall be informed of the vehicular emergency, thereby to be able to respond to the emergency. Various problems have heretofore limited the deployment of automated mechanisms in vehicles for the reporting of the vehicular emergencies. While every vehicle can be outfitted with a cellular mobile station that permanently forms part of the vehicle, mobile stations require SIM cards that uniquely identify each mobile station. Outfitting each vehicle with a separate SIM card is impractical due to reasons of cost, lack of availability of IMSI values, and issues regarding recovery of SIM cards when the vehicle is no longer operated. A need remains, therefore, to provide a manner by which automatically to report a vehicular emergency.

Additionally, due to the urgent nature of the information, there is also a need to make use of reported information, even if, once decoded, the reported information contains decoding errors. Delay associated with requests for resending of the information is unacceptable.

A need also remains therefore, to correct for errors in decoded information, not only with respect to data sent to a PSAP but, more generally, in any communication operation in which coded data is communicated.

It is in light of this background information related to emergency reporting of vehicular emergencies making use of a radio communication system and related to correcting errors in decoded data that the significant improvements of the present disclosure have evolved.

DETAILED DESCRIPTION

Figure 1:
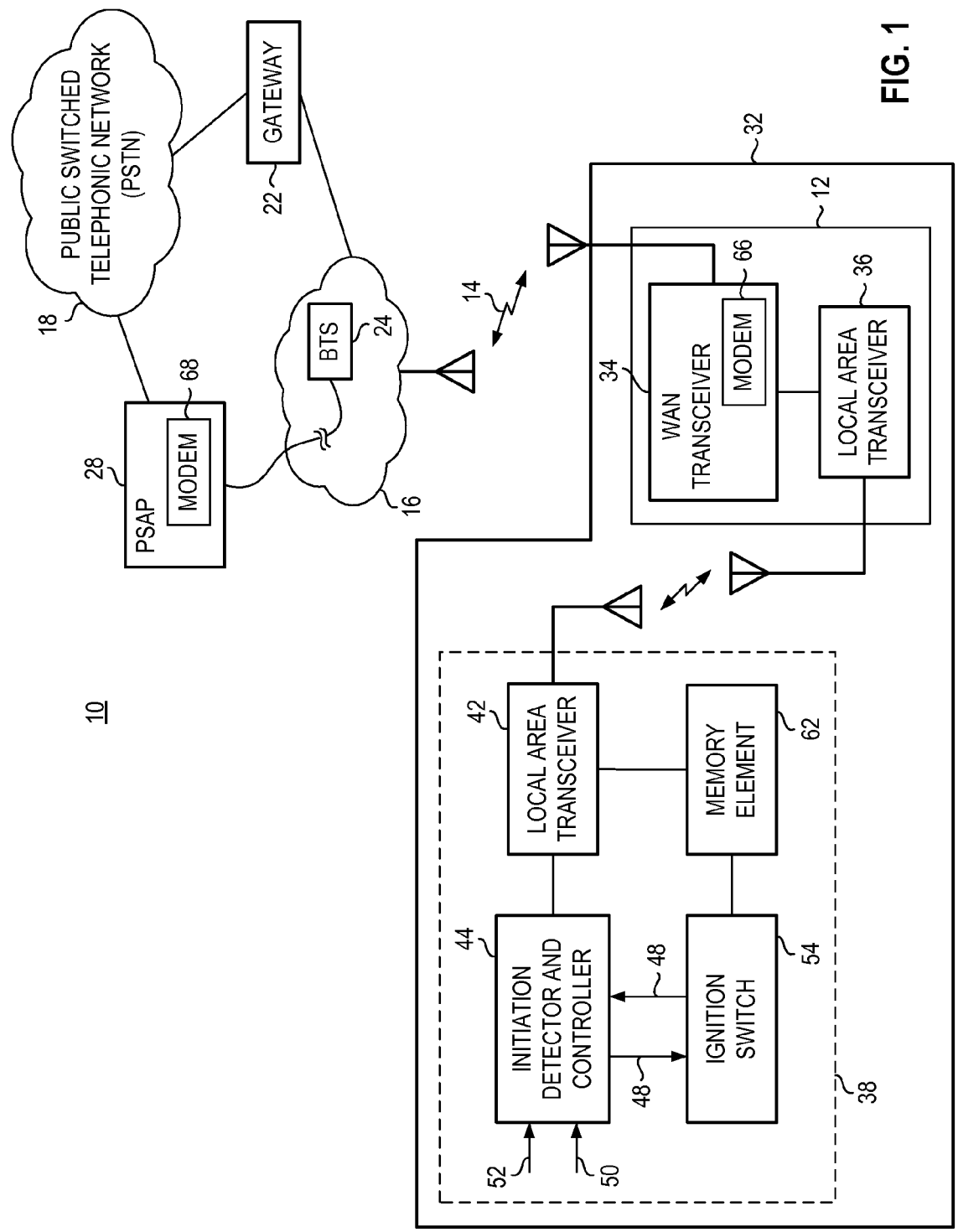
FIG. 1 illustrates a functional block diagram of a communication system in which an embodiment of the present disclosure is operable.

The present disclosure, accordingly, advantageously provides apparatus, and an associated method, by which to communicate, and operate upon convolutionally encoded data.

Through operation of an embodiment of the present disclosure, a manner is also provided by which to correct errors in received, and decoded, data.

In one aspect of the present disclosure, a Bluetooth™, or other, local area transceiver is mounted at the vehicle. When the vehicular emergency occurs, the local area transceiver communicates with a cellular mobile station or other wide area transceiver that also has local area communication capabilities. And, the cellular mobile station communicates with the PSAP. Communications between the cellular mobile station and the PSAP are carried out using TTY devices located at the cellular mobile station and at the PSAP to alert the emergency personnel of the occurrence of the emergency.

In another aspect of the present disclosure, the local area transceiver, mounted at the vehicle, searches for the presence of the cellular, or other wide area, transceiver. When such a wide area transceiver having local area communication capabilities is within proximity to the local area transceiver, the local area transceiver obtains an indication of the identity of the local area transceiver. The identity comprises, for instance, an IP (Internet Protocol) address of the local area transceiver positioned together with the cellular mobile station. That is to say, the local area transceiver mounted at the vehicle searches for a paired transceiver, i.e., a transceiver operable to communicate with the vehicular-mounted local area transceiver.

In another aspect of the present disclosure, the local area transceiver is caused to search for the presence of the cellular mobile station having the local area transceiver capability responsive to a vehicular trip start event. The vehicular trip start event comprises, for instance, the turning of an ignition switch at the vehicle at which the vehicular-positioned local area transceiver is mounted. Or, the vehicular trip start event comprises, e.g., operator actuation of an actuation switch. For instance, a switch positioned at the passenger compartment of the vehicle, available for actuation by a driver of the vehicle is actuated when the driver elects to commence the search operation for the presence of a cellular mobile station having a local area transceiver forming a portion thereof.

In another aspect of the present disclosure, a storage element, such as an accessible memory location, is used to store the identity of the transceiver identified by the vehicular-positioned local area transceiver. The memory location is later accessed in the event that a report of a vehicular emergency is required. The identity is used to address a message that is sent by the vehicular-mounted local area transceiver to the transceiver identified by the identifier stored at the memory location.

In another aspect of the present disclosure, the message, once provided to the transceiver identified to be in proximity to the vehicular-mounted transceiver, is communicated to the PSAP using the radio air interface of the cellular communication system and the network parts extending to the PSAP.

In another aspect of the present disclosure, the indicia is obtained of the identity of the vehicle, such as its VIN (Vehicular Identification Number) and the type of vehicular emergency. The type of vehicular emergency is identified by, e.g., detecting deployment of airbags, detecting overturning of the vehicle, or detection of some other anomaly condition.

In another aspect of the present disclosure, the cellular mobile station includes a TTY element, such as a TTY modem, capable of communicating TTY-formatted data with the PSAP. The PSAP also includes TTY functionality; viz., the PSAP also includes a TTY modem, capable of exchanging TTY-formatted data with the cellular mobile station. Information contained in the message sent by the cellular mobile station to report on the occurrence of the vehicular emergency is displayable upon a monitor connected to the TTY modem of the PSAP. Appropriate dispatch of personnel is made in response to the vehicular emergency report.

Advantage is taken of the common usage of cellular mobile stations. Passengers in a vehicle carry cellular mobile stations that also have Bluetooth™, or other local area transceiver, capabilities. The vehicular-mounted local area transceiver searches for the presence of a cellular mobile station within proximity thereto. And, when a cellular mobile station having the local area transceiver capabilities is detected, its identity is stored and used to route a message in the event of the occurrence of a vehicular emergency. The message includes the identification of the vehicle, its location, such as provided by a GPS receiver, an indication of the type of emergency, and any other appropriate information. The cellular mobile station, in turn, alerts the PSAP of the vehicular emergency through operation of the TTY modem. The appropriate dispatch of emergency personnel to respond best to the vehicular emergency is carried out, all in response to an automatic generation and transmission of the vehicular emergency report.

In these and other aspects, therefore, apparatus, and an associated methodology, is provided for initiating communication of emergency data pursuant to a vehicular emergency. A paired transceiver detection initiation detector is adapted to detect occurrence of a vehicular trip start event. The paired transceiver detection initiation detector is configured to generate a paired transceiver search command responsive to the occurrence of the vehicular trip start event. A local transceiver is adapted to receive the paired transceiver search command generated by the paired transceiver detection initiation detector. The local transceiver is also adapted to receive indicia associated with the vehicle at which the local transceiver is positioned and to receive indication of occurrence of the vehicular emergency. The local transceiver is configured to perform a paired transceiver search responsive to the paired transceiver search command and to generate a vehicular emergency report responsive to the indication of the occurrence of the vehicular emergency.

In these and other aspects, therefore, further apparatus, and an associated methodology, is provided for facilitating recovery of transmitted data. A decoded data recovery checker is configured to check whether the transmitted data, once decoded, is successfully decoded. A bit changer is configured to change part of the transmitted data, once decoded, associated with reliability levels less than a threshold if the decoded data recovery checker determines the transmitted data to be successfully decoded.

Referring first, therefore, to FIG. 1, an example communication system, shown generally at 10, provides for communications between communication endpoints, including mobile stations of which the mobile station 12 is representative. The mobile station 12 communicates by way of communication channels, here designated by the arrow 14, defined upon a radio air interface with a communication network, here formed of a radio access network 16 and a PSTN (Public Switched Telephonic Network) 18. The networks 16 and 18 are interconnected, in conventional manner, here by way of a gateway 22.

The radio access network is here shown to include a base transceiver station (BTS) 24 that includes transceiver elements that transceive communication signals with corresponding circuitry of the mobile station 12. In conventional manner, a typical radio access network includes a plurality of spaced-apart base transceiver stations that together encompass a geographical area over which communications by, and with, mobile stations are permitted. Any of various communication endpoints are connectable to the networks 16 and 18. Here, a PSAP (Public Safety Access Point) 28 is connected to the networks 16 and 18. The PSAP is defined at an emergency dispatch center that receives requests for emergency assistance, and, responsive to such requests, instructs emergency personnel to respond to such requests. The PSAP is, e.g., in the United States, a 911-center to which 911 emergency calls are routed. A call originated at a mobile station, such as the mobile station 12, is routable to the PSAP 28.

The mobile station 12 is representative of a mobile station carried by an occupant of a vehicle 32. That is to say, the mobile station 12 is carried by a user, and, when the user is positioned at the vehicle 32, the mobile station, carried by the user, is also positioned at the vehicle. When the user leaves the vehicle, the mobile station, if carried by the user, is also carried away from the vehicle. The mobile station 12 is not fixedly positioned at the vehicle but, rather, is likely to be positioned at the vehicle only temporarily.

The mobile station 12 includes a set of transceivers, a Wide Area Network (WAN) transceiver 34, and a Local Area (LA) transceiver 36. The transceiver elements 34 and 36 are connected together in conventional manner. In the example implementation, the wide area network transceiver forms a cellular transceiver capable of transceiving the communication signals that are received from, and transmitted to, the radio access network 16. And, the local area transceiver forms a Bluetooth™ transceiver capable of sending and receiving signals over short ranges, e.g., on the order of thirty meters or less. The capacity of a mobile station, such as the mobile station 12, to communicate over a wide area using the transceiver element 34 and to communicate over a local area using the transceiver element 36 is used to advantage pursuant to an embodiment of the present disclosure.

Pursuant to an embodiment of the present disclosure, the vehicle 32 includes apparatus 38 of an embodiment of the present disclosure. The apparatus includes a local area transceiver 42, here also a Bluetooth™ transceiver. The transceiver is herein referred to as a vehicular-positioned transceiver. In the example implementation, the transceiver 42 is permanently maintained at the vehicle 32 and is capable of communicating with the transceiver 36, or corresponding transceiver of another mobile station when the transceiver 42 is positioned in the passenger compartment of the vehicle, or is otherwise in proximity to the transceiver 42.

The apparatus 38 further includes an initiation detector and controller 44. The detector and controller comprises, for instance, an application executable by processing circuitry. The detector and controller is positioned in communication connectivity with the local area transceiver and, in the example implementation, both exert control over its operation and provides indicia to the transceiver that is communicated during operation of the transceiver pursuant to an embodiment of the present disclosure. The detector and controller are provided input indicia, here represented by way of the lines 48, 50 and 52. The line 48 represents a line upon which a trip-start event indicia is provided to the detector and controller. The trip-start event indicia forms, for instance, an indication of an operator of the vehicle 32 turning an ignition switch to commence operation of the vehicle. And, here, the line 48 extends to the ignition switch 54, or electrical contacts thereof. When the operator of the vehicle turns a key in the ignition switch 54, an indication of the start of the vehicular engine is provided by way of the line 48 to the detector and controller 44.

The line 50 is representative of vehicular emergency indicia that is generated upon the occurrence of a vehicular emergency. The indicia is generated, for instance, upon deployment of safety airbags, upon detection of level sensors of upending of the vehicle, or other type of collision sensor indications that indicate collision of the vehicle.

And, the line 52 is representative of a line upon which vehicular identity information, such as a Vehicle Identification Number (VIN) is provided to the detector and controller. The identifier identifies the vehicle, and when the identifier forms the VIN, the vehicle is uniquely identified.

In operation, upon detection of the trip start event, the detector and controller causes the local area transceiver 42 to commence searching operations to detect presence of one to many paired transceivers in proximity to the transceiver 42. The paired transceiver is a transceiver capable of communicating with the transceiver 42 and, here, the transceiver 36 forming a portion of the mobile station 12 defines a paired transceiver when the mobile station 12 is positioned in the passenger compartment of the vehicle or otherwise is positioned in proximity to the transceiver 42 of the apparatus 38.

In the example implementation in which the transceivers 36 and 42 form Bluetooth™-compatible transceivers, interrogation and reply messages are generated, in conventional manner, in conformity with standard Bluetooth™ protocols. The transceiver 36 is identified, e.g., by an IP (Internet Protocol) address. Responsive to the search or inquiry by the transceiver 42, a reply message, containing the IP address of the transceiver 36 is returned to the transceiver 42. A memory element 62, connected to, or forming part of, the transceiver 42 is used to store the IP address, or other identifier, that identifies the transceiver 36. When a plurality of mobile stations 12 are positioned at the vehicle 32 or otherwise positioned in proximity to the transceiver 42, the identities of the plurality of mobile stations and indications thereof are stored at the memory element 62. The identities are ordered in an ordered list, according to any desired selection criteria, and the identities are accessed in the listed order.

In one implementation, subsequent to the initial search made by the transceiver 42, subsequent searches are made at periodic, or other, intervals so that the information stored at the memory element is timely. And, in the event that, responsive to a search, no mobile stations are determined to be at the vehicle 32 or otherwise in proximity thereto, subsequent searches are made at selected intervals to detect the presence of mobile stations subsequently in position in proximity to the transceiver 42.

In the absence of occurrence of a vehicular emergency, the detection of the trip start event and subsequent searching for transceivers in proximity to the vehicular-positioned transceiver 42 is repeated each time that a trip start event is detected. Upon the occurrence of a vehicular emergency, indication of its occurrence is provided to the detector and controller 44 by way of the line 52. And, the detector and controller alerts the vehicular-positioned transceiver 42 of the occurrence. In response, the transceiver 42 is caused to generate a message that is communicated to the transceiver 36 whose identity is stored at the memory element 62. That is to say, the contents of the memory element are retrieved in order to identity to where to route a message that is generated by the vehicular-positioned transceiver.

Once ascertained, the memory contents are used to address the message and the message is populated with indications of the vehicular emergency together with the identity of the vehicle. The message is sent and delivered to the identified transceiver, here the transceiver 36. Information contained in the message is utilized pursuant to a request made by the wide area network transceiver 34 to the PSAP 28.

In the example implementation, the transceiver 34 includes a TTY modem 66 capable of transmitting TTY-formatted data. The PSAP 28 also includes a TTY modem, designated at 68, also capable of communicating TTY-formatted data. Subsequent to conventional call set-up with the PSAP, in the example implementation, the information associated with the vehicular emergency is communicated by way of the TTY modems. The call is placed automatically, and the information is communicated automatically, without need for user interaction. In the event that the occupants of the vehicle are unable to place a call for emergency assistance or provide other information, the information needed to alert the PSAP and the personnel thereat of the occurrence of the vehicular emergency is automatically provided.

In a further implementation, indicia provided to the detector and controller also includes GPS (Global Positioning System) positioning information, and such positioning information is included in the message generated by the local area transceiver 42 and is communicated to the PSAP. Personnel at the emergency dispatch center at which the PSAP is positioned are able to respond to the exact location at which the vehicular emergency has occurred.

Figure 2A:
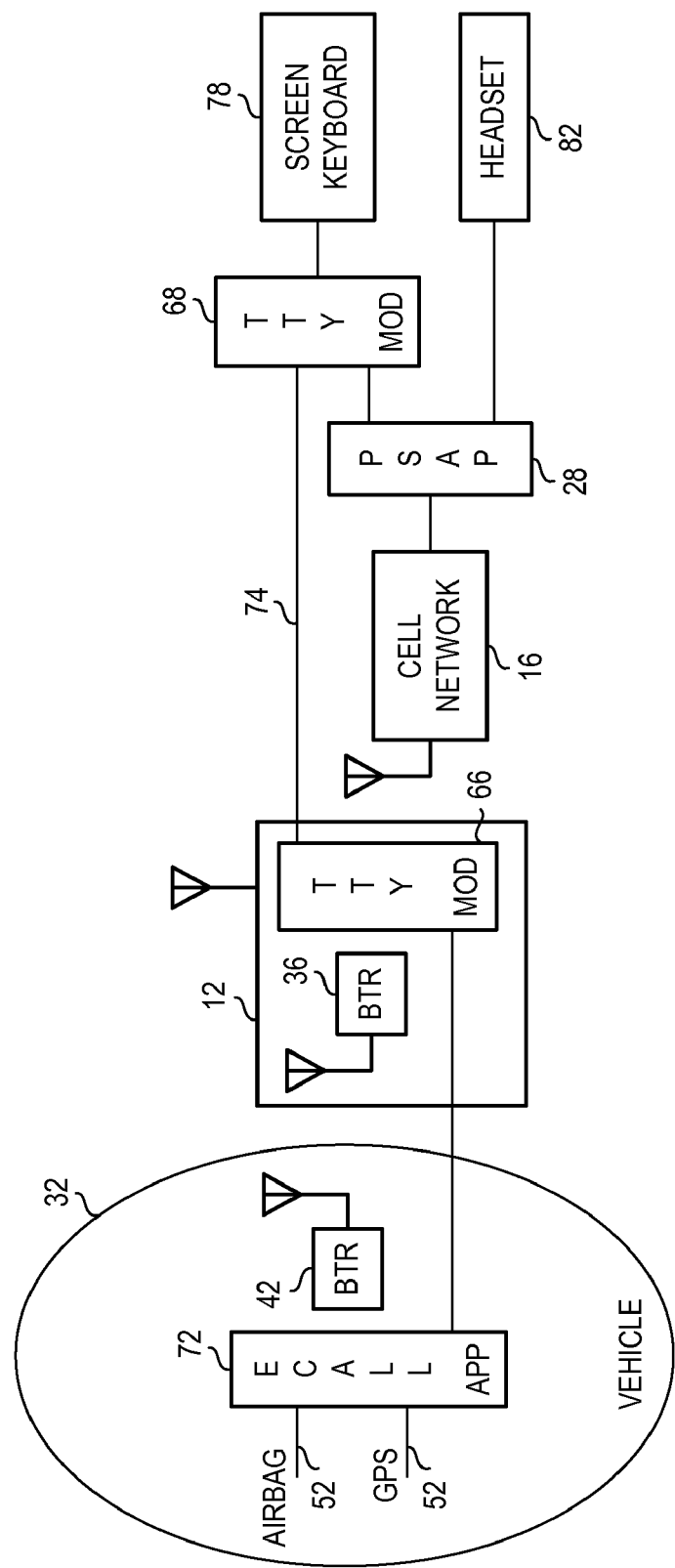
FIG. 2A illustrates a functional block diagram illustrating portions of the communication system shown in FIG. 1.

FIG. 2A illustrates a representation of various of the elements shown in the communication system of FIG. 1. Again, the vehicle 32 is shown at which the vehicular-positioned transceiver 42 is located. The transceiver is positioned in communication connectivity with an e-call application 72 that forms the initiation detector and controller 44, shown in FIG. 1, in the example implementation. Lines 52 extending to the application 72 provide indication of deployment of an airbag and GPS information.

As noted previously, upon the occurrence of the vehicular emergency, the information associated with the vehicular emergency is communicated to a mobile station 12 by way of the paired transceiver 36 paired with the transceiver 42. And, the information is provided to the TTY modem 66 forming part of the wide area network transceiver of the mobile station.

A call is automatically placed by the mobile station to the PSAP by way of the network 16. And, the modem 68 of the PSAP is placed in communication connectivity, here indicated by way of the lines 74, with the modem 66. Information, in textual form, is communicated to the TTY modem 68 and subsequently displayed upon a screened keyboard 78. A headset 82 is also positioned at the PSAP to permit an operator positioned thereat to receive calls placed to the PSAP.

Any of various pertinent information is provided in the form of textual data including the GPS coordinates, the vehicle orientation, deployment of airbags, and, if so, which of the airbags are deployed, the VIN of the vehicle, a time stamp of the accident, as well as service provider identifications, e.g., the cellular operator through which the call was placed. Data is also communicated, if needed, by the modem 68 to the modem 66, e.g., to communicate requests for further information. By including the identity of the vehicle, by way of its VIN or other identifier, the identity of the vehicle is validated.

Here, when a determination is made to make an e-call, the application uses the default cell phone known to be in proximity of the vehicle. Knowledge of the proximity is made pursuant to a search procedure initiated, e.g., by the vehicle operator's turning of an ignition key, starting of the engine, actuation of an actuator, etc. Responsive to the search, a paired transceiver, if any, positioned in proximity to the vehicular-positioned transceiver is detected. A record is maintained of the detected transceiver, and in the event of a vehicular emergency, the identity of the detected transceiver is used pursuant to an emergency call. If the identified transceiver is unavailable, a message is attempted to be communicated to another transceiver, if any. If no other transceivers are recorded to be available, a new search is undertaken to detect for its presence.

Figure 2B:
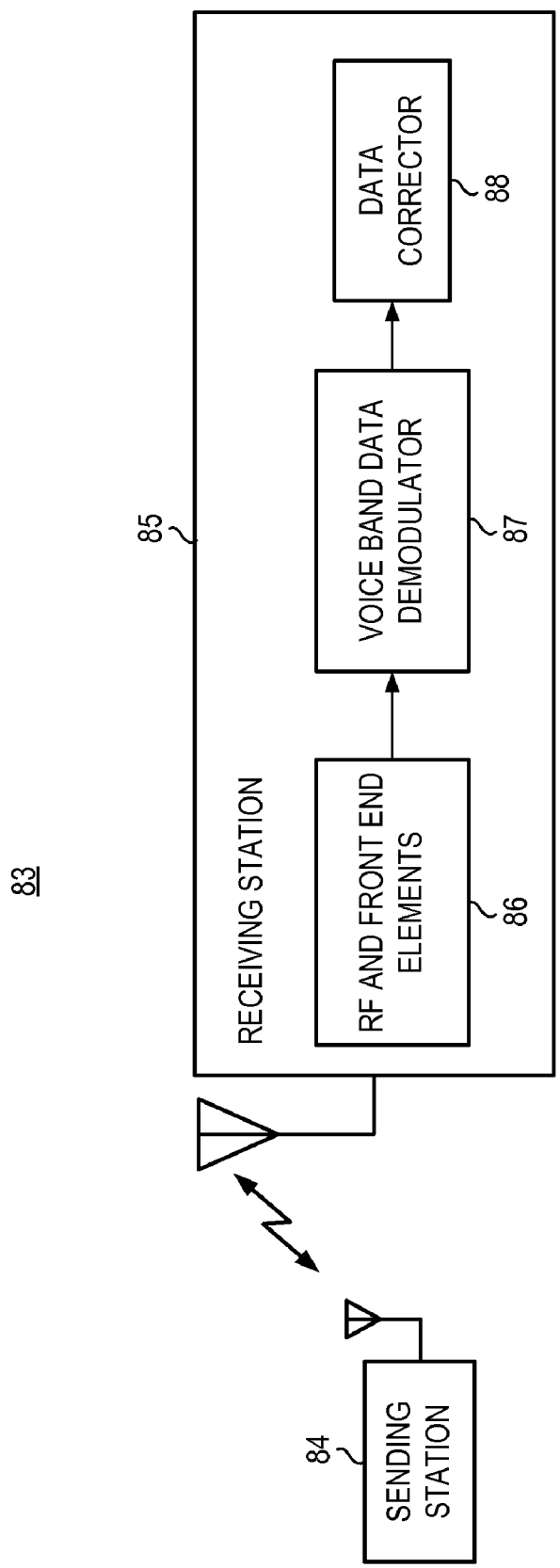
FIG. 2B illustrates a functional block diagram of another communication system in which an embodiment of the present disclosure is operable.

Turning next to FIG. 2B, a generic communication system, shown generally at 83, illustrates a generalized communication system in which an embodiment of the present disclosure is operable. A sending station is shown that generates and sends, here by way of a radio air interface, convolutionally encoded data. An example of the data that is sent is the information described with respect to the implementations set forth in FIGS. 1 and 2A.

A receiving station 85 receives the transmitted information. The receiving station includes an RF (Radio Frequency) and front-end element 86 that converts the transmitted information, once received, downward in frequency. The front end element 86 also performs other functions, such as demodulation, channel decoding, and speech decoding operations.

A voice band demodulator 87 is provided with the transmitted information, once operated upon by the element 86. The voice band data demodulator comprises, for instance, a CTM demodulator and operates, amongst other things, to covert tones to bits. Additional operations by additional elements, such as a deinterleaver element (not shown) operates upon the bits formed by the demodulator. And, the bits, still convolutionally encoded, are provided to a data corrector 88 of an embodiment of the present disclosure. Further operation of the data corrector shall be described below with respect to FIGS. 5 and 6.

Figure 3:
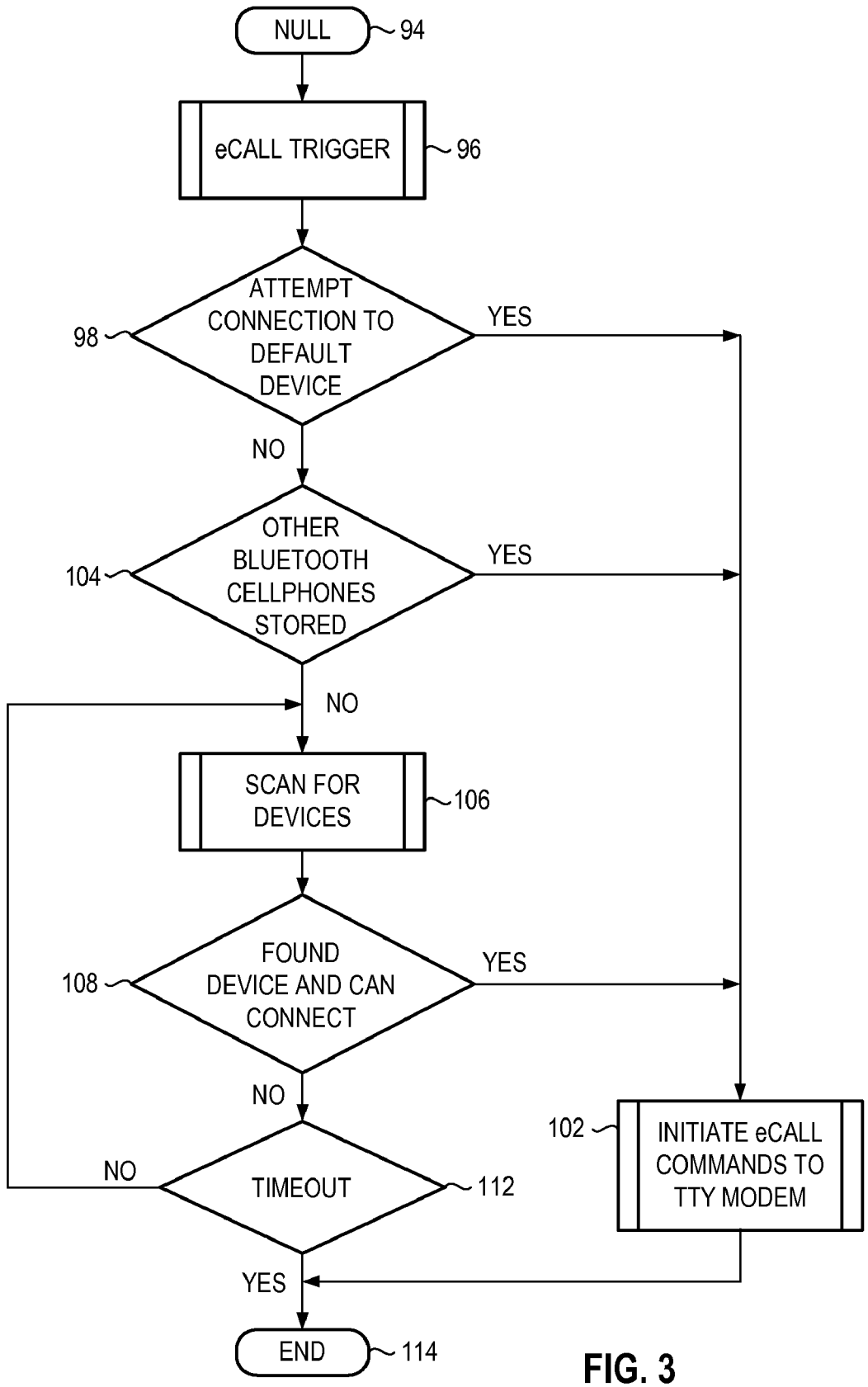
FIG. 3 illustrates a process diagram representative of operation of an embodiment of the present disclosure.

FIG. 3 illustrates a process diagram, shown generally at 92, representative of example operation of an embodiment of the present disclosure, such as that described with respect to FIGS. 1 and 2A above. After entry at the null state 94, a path is taken to the block 96 at which an e-call is triggered responsive to the occurrence of a vehicular emergency.

A path is taken to the decision block 98 and at which an attempt is made to connect to a default device, i.e., a paired transceiver determined to be in proximity to the vehicular-positioned transceiver. If a connection is made, the yes branch is taken to the block 102, and an emergency call is initiated, including commands given to a TTY modem.

If, conversely, the attempt to connect to the default device is unsuccessful, the no branch is taken from the decision block 98 to the decision block 104. If the identity of another paired transceiver is available, the yes branch is again taken to the block 102 and the emergency call is initiated. If, conversely, no other identities are stored, the no branch is taken from the decision block 104 to the block 106 and a scan is made to search for available, paired transceivers.

Then, and as indicated by the decision block 108, a determination is made whether an alternate transceiver is located. If so, the yes branch is taken to the block 102. Otherwise, the no branch is taken to the block 112, and a determination is made as to whether a timeout period has timed out. If not, the no branch is taken back to the block 106 and the procedure continues. If, conversely, the timeout period has timed out, the yes branch is taken to the end block 114. A branch is also taken upon conclusion of the block 102 to the end block 114.

Figure 4:
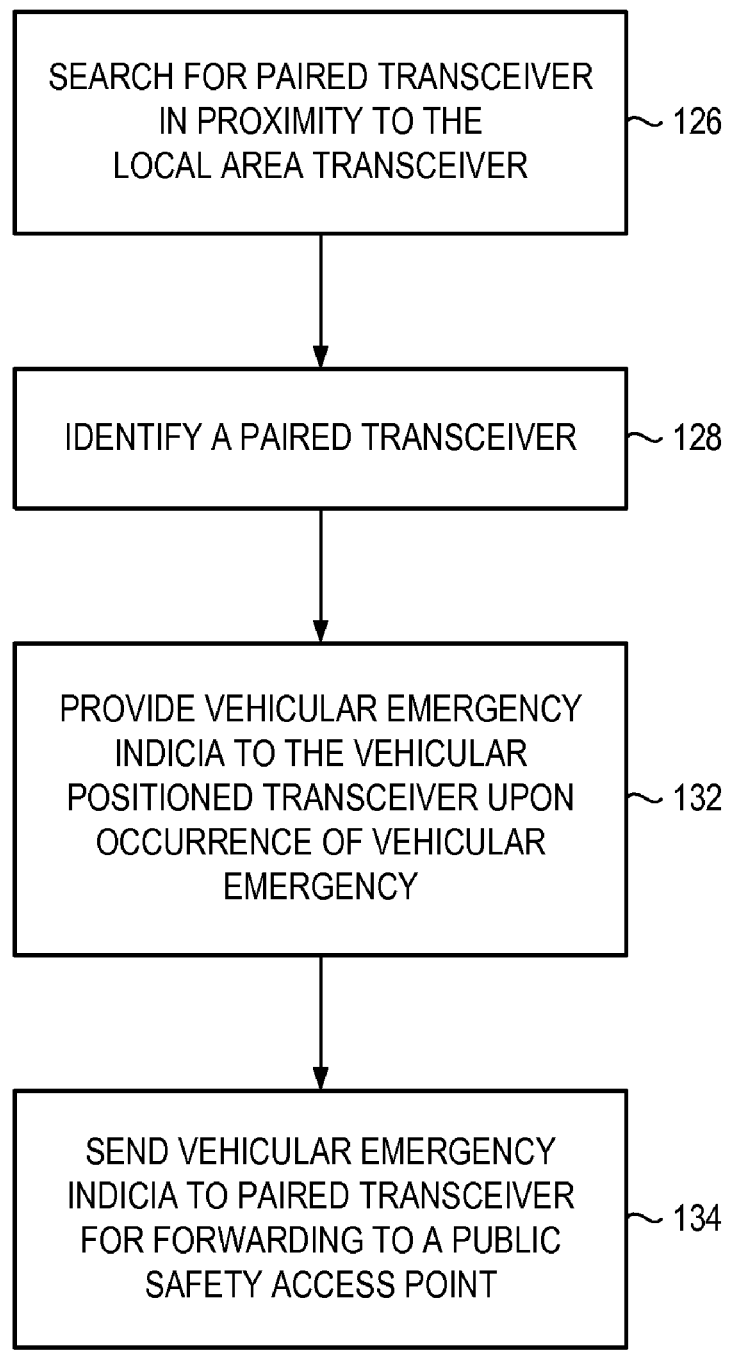
FIG. 4 illustrates a method flow diagram listing the method of operation of an embodiment of the present disclosure.

FIG. 4 illustrates a method flow diagram, shown generally at 124, representative of the method of operation of an embodiment of the present disclosure. The method facilitates communication of emergency data pursuant to a vehicular emergency.

First, and as indicated by the block 126, a paired transceiver search is performed by a vehicular-positioned local transceiver to identify a paired transceiver in proximity to the vehicular-positioned local transceiver. Then, and as indicated by the block 128, a paired transceiver is identified responsive to the paired transceiver search.

And, as indicated by the block 132, vehicular emergency indicia is provided to the vehicular-positioned transceiver upon occurrence of the vehicular emergency. Then, and as indicated by the block 134, the vehicular emergency indicia is sent to the paired transceiver for forwarding on to a public safety access point.

Thereby, upon occurrence of a vehicular emergency, a report of the vehicular emergency is automatically made, taking advantage of the availability of a mobile station positioned in proximity to the vehicle at which the vehicular emergency has occurred.

Figure 5:
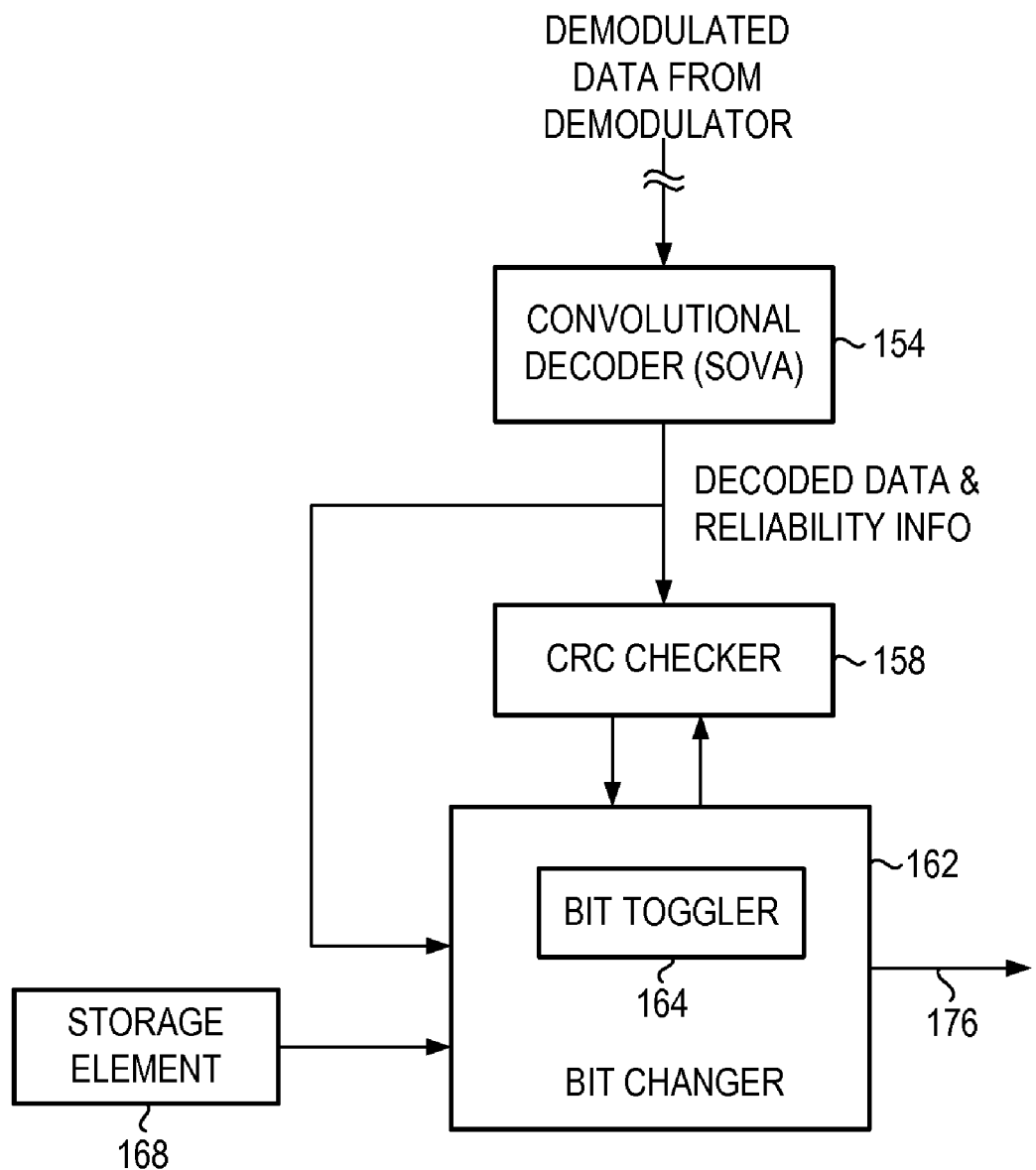
FIG. 5 illustrates a functional block diagram illustrating additional portions of the communication system shown in FIG. 1.

Turning next to FIG. 5, apparatus, shown generally at 88, that forms the data corrector 88 that comprises part of the receiving station 85 shown in FIG. 2B. More generally, the apparatus 88 is operable to correct for errors contained in convolutionally decoded data received at a receiving station. Error correction is performed rather than requesting resending of data. In situations, such as emergency situations in which requesting resending of, and then resending, data is impractical due to the resultant delays or inability to resend the data, correction of the received data facilitates recreation of the information content of the communicated data.

In the example implementation, the information that is sent by a sending station, such as the sending station 84 shown in FIG. 2B, is convolutionally coded by a convolutional encoder. In general, a convolutional encoder has an m-bit input and K−1 m-bit memory locations. K is called the constraint length of the code because there are K input values that affect the output, the current input and the K−1 previous input values stored in memory. The values of the K−1 memory locations represent the state of the encoder. Each time that m bits are input to the encoder, there are n bits output and the code is said to be a rate m/n code. Coding of the data is sometimes represented by a trellis. And, corresponding decoding of the data is also sometimes represented by a trellis. The sequence of possible encoder states in time is usually represented by a trellis diagram. A branch in the trellis is a transition from one state to another. Two branches are said to be connected if one branch terminates in the same state in which the other branch originates at a particular point in time. A path is a sequence of connected branches.

The apparatus 88 is functionally represented, implementable in any desired manner, including by algorithms executable by processing circuitry. And, while the elements forming the apparatus 88 are positioned at a single location, in other implementations, the functionalities provided by the various elements are distributed amongst two or more physical locations or entities. Here, the apparatus 88 is shown to include a convolutional decoder 154, a CRC (Cyclic Redundancy Code) checker 158, a bit changer 162, here comprising a bit toggler 164, and a storage element 168.

Demodulated bits, demodulated by the demodulator 87 (shown in FIG. 2B) are provided to the convolutional decoder 154. The convolutional decoder decodes the coded, demodulated bits provided to the decoder. The type of, and coding rate by which the data was encoded, is known to the decoder. The decoder operates in conventional manner to decode the convolutionally coded data and to provide decoded data on the line 172 to the CRC checker 158.

The CRC checker checks the CRC code contained in the decoded data. If the CRC check is passed, the data is considered to be successfully decoded. Conversely, if the CRC check fails, the data is considered not to be successfully decoded. And, errors in the decoded data need to be corrected prior to further processing of the decoded data.

Indications of the CRC check results are provided to the bit changer 162. If the CRC check is passed, the bit changer operates as a pass through, and the decoded data generated on the line 172 are provided on the line 176, available for further processing. If, conversely, the CRC check fails, the bit changer operates to toggle the values of a selected one or more bits of the decoded data. The storage element 168 contains values that are retrieved and used by the bit toggler to alter values of one or more bits of the decoded data. Once altered, the altered sequence of data is provided to the CRC checker, and the CRC check is again performed. If the CRC check is passed, the altered string of data is considered to be corrected, and the corrected string is provided on the line 176. Otherwise, another value is retrieved from the storage element and the process repeats, in an iterative manner.

In the example implementation, the convolutionally decoded bits provided on the line 172 each have a reliability level associated therewith. The decoder, in the example implementation, forms, e.g., an SOVA (Soft Output Viterbi Algorithm). The reliability information is used by the bit changer 162 in the selection of which bit or bits to toggle. The SOVA (Soft Output Viterbi Algorithm) is a variant of the Viterbi Algorithm which provides reliability information for each decoded bit. A Viterbi algorithm finds the maximum-likelihood path through the trellis given the received sequence of symbols. For every path through the trellis, there is a corresponding input sequence of information bits and also a corresponding output sequence of encoded bits. An error event begins when a decoding decision causes a departure from the correct path through the trellis and ends when the paths are joined again.

In a linear code, an assumption can be made that a sequence of bits are all zeros, and an analysis of the sequence is the same as if any other bit sequence is sent. The decoder 154 operates to find a Maximum Likelihood (ML) path through a trellis formed of possible paths of the data values. An error-event begins when a decoding decision results in a departure from the correct path through the trellis. And the error-event ends when the paths, i.e., the error-event path and the correct path, are again joined. With any convolutional code, it is possible to list the most likely error events for the reason that the most-likely error events exhibit smallest hamming weights. In an example scenario, the ten most-likely error events for a rate one quarter convolutional code used in CTM (Cellular Text Telephony Modem) would result in the following ten decoding errors: 1) 10000, i.e., a single bit is incorrect; 2) 110000; 3) 101000; 4) 1110000; 5) 10110000, 6) 11110000; 7) 101010000; 8) 11010000; 9) 111110000; and 10) 1110110000. CTM utilizes a rate one quarter convolutional code having four generators, represented in octal formas (52), (56), (66), and (76). The code has a minimum free distance of sixteen.

At the completion of the decoding, corresponding to the sequence of the coded bits, there is a corresponding sequence of reliability estimates.

In the event of a CRC test failure indication, the reliability information of the sequence is analyzed. The reliability decreases during an error event. For example, if the error event corresponds to a single decoder error, then there is a drop in the reliability estimate of the length corresponding to the error event, e.g., corresponding to the bits 1000, corresponding to the departure to the correct path in the trellis. For this particular code, four bits are required to merge the error-event path with the correct path. As there is a very high probability that the error event is one of the most-likely error events, toggling of the bits according to the error patterns at locations in the decoded data sequence where the reliability is the lowest, and then running the CRC check, provides for correction of the erroneously decoded sequence.

While additional computation is required at the PSAP, or other receiving communication station, the correction is made more quickly than if a request to resend the data is made.

Figure 6:
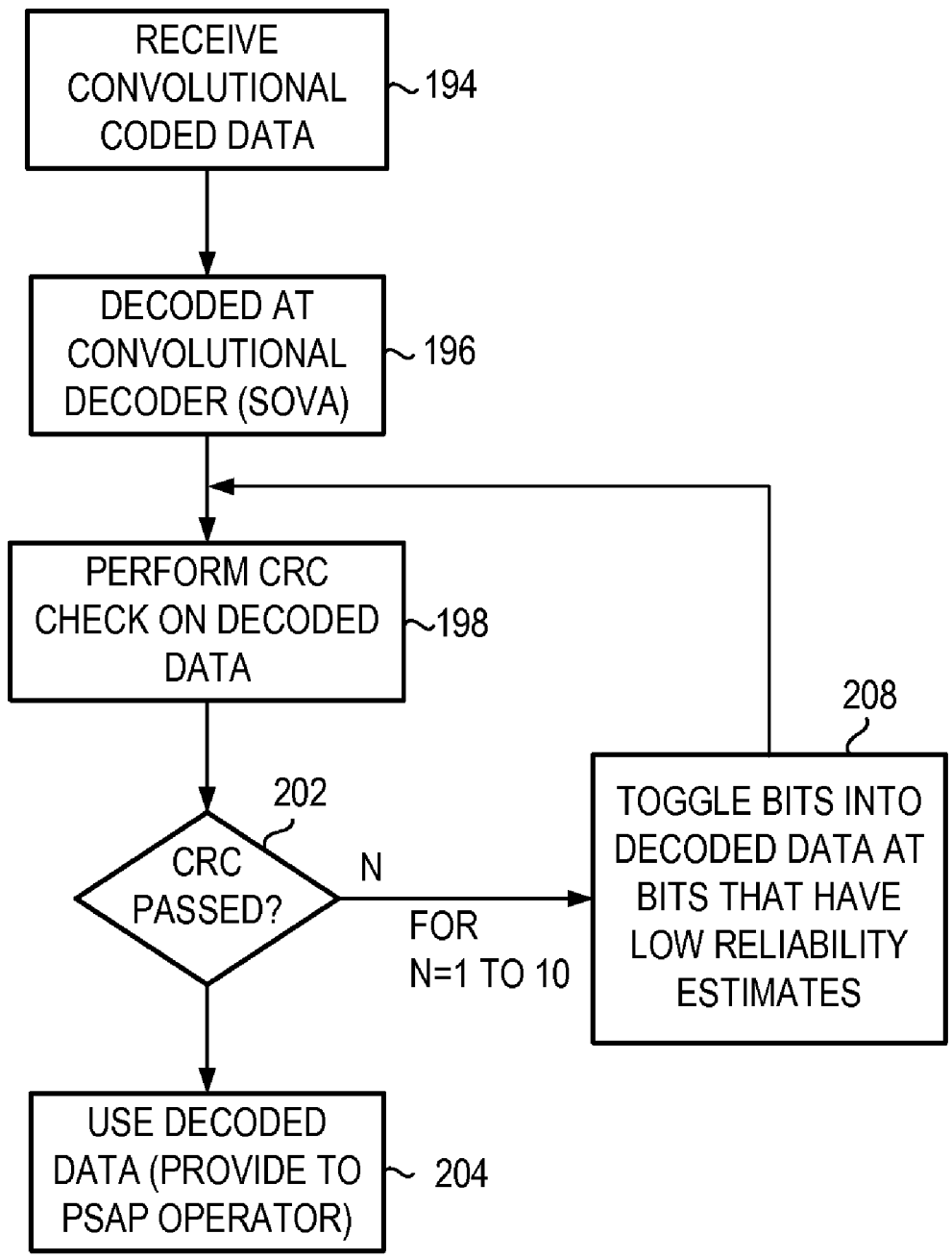
FIG. 6 illustrates a process diagram representative of the operation of the structure shown in FIG. 5.

FIG. 6 illustrates a process diagram, shown generally at 192, representative of the operation of the apparatus 152. First, and as indicated by the block 194, convolutionally coded data is received. Then, and as indicated by the block 196, the data is convolutionally decoded by a convolutional decoder. For example, the decoder forms an SOVA.

Then, and as indicated by the block 198, a CRC check is performed on the decoded data. And, a determination is made, indicated by the decision block 202, as to whether the CRC check is passed. If so, the yes branch is taken to the block 204, and the decoded data is considered to be correct and is provided for further processing. If, conversely, the CRC check is not passed, i.e., fails, the no branch is taken to the block 208, and bits are toggled into the decoded data at locations that exhibit low reliability estimates. Once toggled, a path is taken to the block 198, and a CRC check is once again performed. A determination is again made, indicated by the decision block 202, as to whether the CRC check is passed. The paths are taken to the block 204 or 208, as appropriate, responsive to the decision made at the decision block.

The previous descriptions are of preferred examples for implementing the disclosure, and the scope of the disclosure should not necessarily be limited by this description. The scope of the present disclosure is defined by the following claims.

What is claimed is:

1. An apparatus for facilitating recovery of automatically transmitted data of an emergency message, said apparatus comprising:
   a decoder configured to decode the transmitted data of the emergency message, the emergency message including information associated with a vehicular emergency;
   a decoded data recovery checker configured to check whether the transmitted data, once decoded, is successfully decoded;
   a storage element configured to store at least one value corresponding to a coded data part of the transmitted data of the emergency message whose decoding is associated with a likely error event; and
   a bit changer configured to change part of the transmitted data of the emergency message once decoded associated with reliability levels less than a threshold, the change being in accordance with the at least one value stored in the storage element and that is retrieved by said bit changer, if said decoded data recovery checker determines the transmitted data to be unsuccessfully decoded and to return the transmitted data having the changed part to the decoded data recovery checker, the transmitted data of the emergency message with the changed part, once successfully decoded, permitting use of the information associated with the vehicular emergency while obviating necessity to request retransmission of the transmitted data of the emergency message.

2. The apparatus of claim 1 wherein said decoded data recovery checker is further configured to check whether the transmitted data, once decoded, and with the part changed by said bit changer is successfully decoded.

3. The apparatus of claim 2 wherein said decoded data recovery checker and said bit changer are configured to operate iteratively.

4. The apparatus of claim 1 wherein said bit changer is configured to toggle selected bits of the part of the transmitted data, once decoded, that is associated with the reliability levels less than the threshold.

5. The apparatus of claim 1 wherein said decoder comprises a convolutional decoder.

6. The apparatus of claim 1 wherein said decoded data recovery checker comprises a CRC, cyclic redundancy code, checker.

7. The apparatus of claim 1 wherein said storage element is further configured to store a plurality of values.

8. The apparatus of claim 1 wherein the value corresponds to a coded data part whose decoding is associated with a likely error event.

9. The apparatus of claim 1 wherein the transmitted data checked by said decoded data recovery checker comprises voice-band modem data.

10. The apparatus of claim 1 wherein said decoded data recovery checker is embodied at a PSAP, Public Safety Access Point.

11. A method for facilitating recovery of automatically transmitted data of an emergency message, said method comprising:
    decoding the transmitted data of the emergency message, the emergency message including information associated with a vehicular emergency;
    checking whether the transmitted data, once decoded, is successfully decoded;
    storing at least one value corresponding to a coded data part of the transmitted data whose decoding is associated with a likely error event;
    changing part of the transmitted data, once decoded, associated with reliability levels less than a threshold if the transmitted data is unsuccessfully decoded, the change being in accordance with the at least one value stored in, and retrieved from, the storage element, if the transmitted data is unsuccessfully decoded; and
    checking whether transmitted data having the changed part is successfully decoded, the transmitted data of the emergency message with the changed part, once successfully decoded, permitting use of information associated with the vehicular emergency while obviating necessity to request retransmission of the transmitted data of the emergency message.

12. The method of claim 11 wherein said checking comprises performing a CRC, Cyclic Redundancy Code, check upon a CRC contained in the transmitted data.

13. The method of claim 11 wherein said checking and said changing are performed iteratively.

14. The method of claim 11 wherein said checking further comprises checking whether the transmitted data, once decoded, and with the part changed responsive to said changing the part of the transmitted data is successfully decoded.

15. The method of claim 11 wherein said changing comprises toggling selected bits of the part of the transmitted data, once decoded, that is associated with the reliability levels less than the threshold.

16. The method of claim 11 further comprising storing a value used when changing the part of the transmitted data, once decoded.

17. The method of claim 16 wherein said storing comprises storing a plurality of values.

18. The method of claim 16 wherein the value corresponds to a coded data part whose decoding is associated with a likely error event.

* * * * *